(12) United States Patent
Ruehle

(10) Patent No.: US 8,909,672 B2
(45) Date of Patent: Dec. 9, 2014

(54) BEGIN ANCHOR ANNOTATION IN DFAS

(75) Inventor: Michael Ruehle, Albuquerque, NM (US)

(73) Assignee: LSI Corporation, San Jose, CA (US)

( * ) Notice: Subject to any disclaimer, the term of this patent is extended or adjusted under 35 U.S.C. 154(b) by 126 days.

(21) Appl. No.: 13/353,130

(22) Filed: Jan. 18, 2012

(65) Prior Publication Data

US 2013/0046784 A1 Feb. 21, 2013

Related U.S. Application Data

(60) Provisional application No. 61/524,394, filed on Aug. 17, 2011.

(51) Int. Cl.
*G06F 17/30* (2006.01)
*G06K 9/68* (2006.01)

(52) U.S. Cl.
CPC .................... *G06K 9/6878* (2013.01)
USPC ........................................ 707/776; 707/739

(58) Field of Classification Search
CPC .............. G06F 17/277; G06F 17/2785; G06F 17/30038; G06F 17/30539
USPC ......... 707/712, 722, 736, 739, 755, 758, 776, 707/777, 778, 780, 796, 999.006, 706, 761, 707/767, E17.014, E17.039, E17.041; 711/205, 207, 212, 267, 200; 715/230–233; 704/3–9; 709/224, 230; 726/22

See application file for complete search history.

(56) References Cited

U.S. PATENT DOCUMENTS

| | | | |
|---|---|---|---|
| 7,899,904 B2 * | 3/2011 | Ruehle .......................... | 709/224 |
| 2003/0051043 A1 * | 3/2003 | Wyschogrod et al. ........ | 709/230 |
| 2005/0273450 A1 | 12/2005 | McMillen et al. | |
| 2008/0270342 A1 | 10/2008 | Ruehle | |
| 2010/0125593 A1 * | 5/2010 | Suthar et al. .................. | 707/758 |
| 2011/0029550 A1 * | 2/2011 | Pandya ......................... | 707/758 |
| 2012/0054169 A1 * | 3/2012 | Marmaros et al. ............ | 707/706 |
| 2012/0296872 A1 * | 11/2012 | Frost et al. .................... | 707/634 |

* cited by examiner

*Primary Examiner* — Greta Robinson

(57) ABSTRACT

Disclosed is a method and system of matching a string of symbols to a ruleset. The ruleset comprise a set of rules. The method includes ignoring begin anchor requirements when constructing a DFA from all the rules of the ruleset, annotating the accepting states of the DFA with the begin anchor information, executing the DFA, and checking begin anchor annotations to determine if begin anchor requirement are satisfied if an accepting state is reached. Embodiments also include rulesets with begin anchors on matches, rulesets with early exit information on non-accepting states, and rulesets with accept begin anchors in accepting states.

8 Claims, 6 Drawing Sheets

BEGIN ANCHOR ANNOTATION IN DFAS

CROSS-REFERENCE TO RELATED APPLICATION

The present application is based upon and claims the benefit of U.S. Provisional Patent Application Ser. No. 61/524,394, filed Aug. 17, 2011, by Michael Ruehle, entitled "Begin Anchor Annotation in DFAs," which application is hereby specifically incorporated herein by reference for all that it discloses and teaches.

BACKGROUND

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example.

Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic.

As information is transported across a network, there are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY

An embodiment of the invention may therefore comprise a method of matching a string of symbols to a ruleset. A ruleset comprises a set of pattern matching rules. The method may comprise ignoring begin anchor requirements when constructing the DFA from all the rules of the ruleset, annotating the accepting states of a DFA corresponding to the ruleset with begin anchor information, executing the DFA by a descent from a DFA root state, checking the begin anchor annotations to determine whether begin anchor requirements are satisfied if an accepting state match is reached, and reporting the match if the begin anchor requirements as annotated are satisfied.

An embodiment of the invention may further comprise a method of matching a string of symbols to a ruleset. The method includes the steps of ignoring begin anchor requirements when constructing a DFA from all the rules of the ruleset, annotating at least one state of a DFA with early exit information (the early exit information comprises begin anchor requirements for all accepting states reachable from said states), executing the DFA by a descent from a DFA root state, and terminating the descent. Terminating the descent may occur if during the execution of the DFA when visiting said at least one state, early exit information is not satisfied.

An embodiment of the invention may further comprise a method of matching a string of symbols to a ruleset. The method may comprise ignoring begin anchor requirements when constructing DFA from all the rules of the ruleset, annotating at least one accepting state of a DFA corresponding with the ruleset with accept begin anchor information (the accept begin anchor information indicates all distinct begin anchor requirements for rule matches associated with said accepting state), executing the DFA by a descent from a DFA root state (if an accepting state is visited), comparing the accept begin anchor annotations directly to a current anchor status, and outputting information for each match if its anchor requirements are satisfied.

DETAILED DESCRIPTION OF THE EMBODIMENTS

Figure 1:
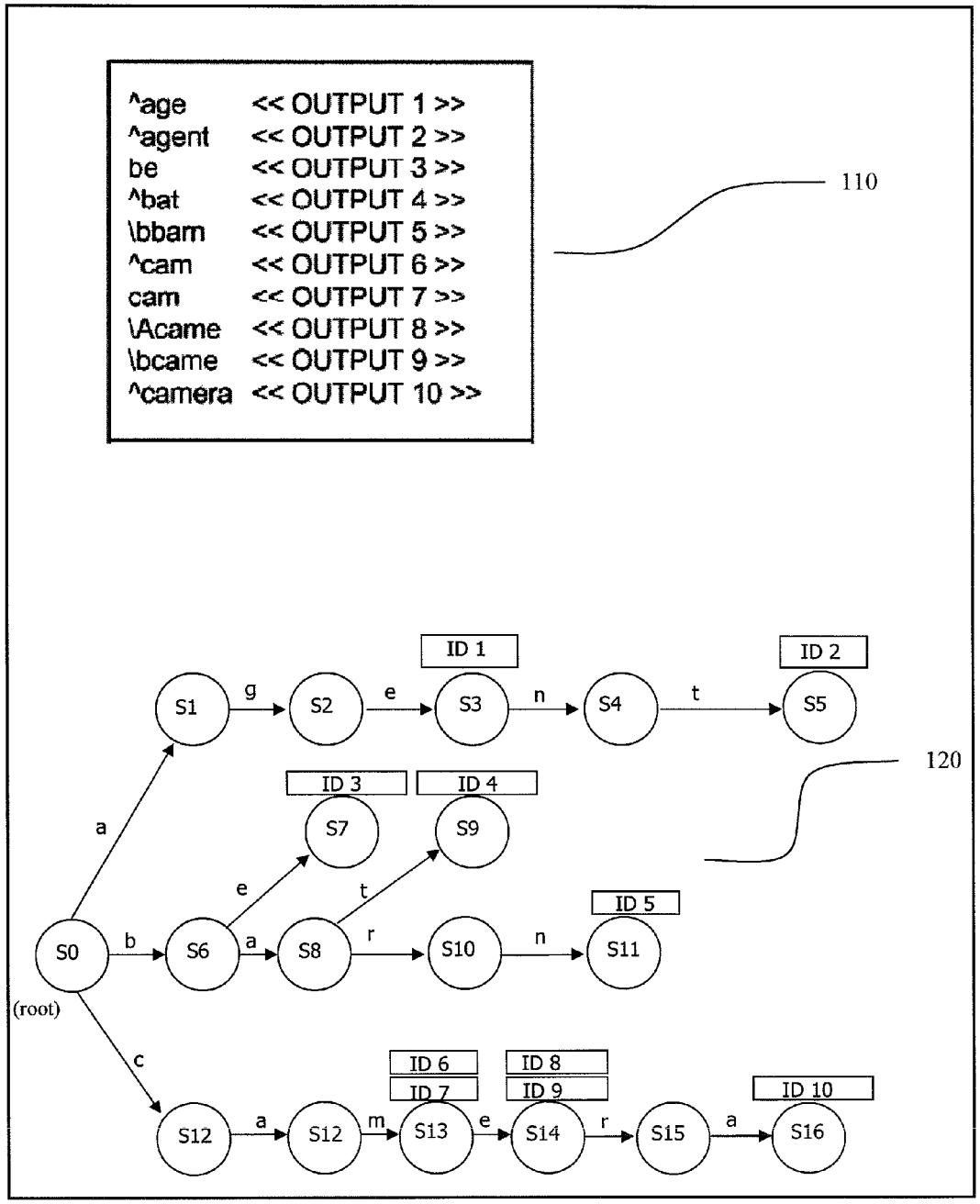
FIG. 1 is a representation of a state machine with Begin Anchors ignored.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". It is understood by those skilled in the art that regular expressions are but a subset of the types of rules that can be utilized to matches within an input stream. Those skilled in the art will understand that "rules" or "rulesets" are a term that includes regular expressions as well as other types of rules used in matching exercises. Where the term "regular expressions" is used, it is also understood that this includes the broader term "rules" and is not meant to limit the discussion to the term "regular expressions". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
- the sequence of characters "car" appearing consecutively in any context, such as in "car", "cartoon", or "bicarbonate"
- the sequence of characters "car" occurring in that order with other characters between them, such as in "Icelander" or "chandler"
- the word "car" when it appears as an isolated word
- the word "car when preceded by the word "blue" or "red"
- the word "car" when not preceded by the word "motor"
- a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

As an example of the syntax, the regular expression \bex can be used to search for all instances of the string "ex" that occur after "word boundaries". Thus, \b matches either (1) at the beginning of a word (between a non-word character and a word character), or (2) at the end of a word (between a word-character and a non-word character). A "word character" typically means a lowercase or uppercase letter, a digit, or an underscore: [a-zA-Z0-9_]. For instance, in the string "text experts", \bex matches the "ex" in "experts", but not the "ex" in "text".

Another text oriented feature available in some systems using regular expressions is anchoring an expression to a particular location in a line. Anchors are a useful and necessary tool when constructing regexes. However, anchors are dissimilar to literal characters or character classes in their use and meaning. Anchors do not match any character in the same sense as characters or classes. Rather, anchors match a position before, after or between characters. Previously, "word boundaries" were discussed in the use of an example regex. They can be used to "anchor" the regex match at a certain position.

Common rule languages such as POSIX and PCRE support a variety of "begin anchors", not contemplated in classical regular expressions, which restrict the rule to matching only strings that start in positions with certain properties. For example:
- "^alpha.*beta"—matches only if "alpha" is at the beginning of a line of text (BOL)
- "\Aalpha.*beta"—matches only if "alpha" is at the beginning of the input stream (BOS)
- "\Yalpha.*beta"—matches only if "alpha" is at the beginning of a packet (BOP)
- "\balpha.*beta"—matches only if "alpha is at a word boundary (WB)
- "\Balpha.*beta"—matches only if "alpha" is not at a word boundary (NWB)

To match classical regular expressions, two main types of state machines may be constructed, nondeterministic and deterministic finite automata (NFAs and DFAs). NFAs for multiple rules are commonly executed separately, either in a sequential manner as in software, or in a parallel manner as in hardware. In such NFA environments, it is relatively straightforward to extend beyond classical regular expressions and support begin anchors, which may simply be checked before consuming the first symbol of a potential match.

By contrast, a single DFA is commonly constructed to find matches for many rules at once. A single execution of a classical (non-Aho-Corasick) DFA may be sufficient to find any match to any rule that begins at a given first symbol in the input stream. Of course, it is also possible to construct and execute multiple DFAs for multiple rules. The ability to find all matches using a single DFA is a significant advantage over NFAs.

Using a single DFA for multiple rules, some of which have various begin anchors, presents difficulties. Normally, the DFA has a single root state, in which a scan begins before consuming the first input symbol of a stream. When the first input symbol is consumed, it either triggers a transition from the root state to one next state in the DFA or it fails to match any transition, which means no rule matches the input. Additional input symbols are then consumed, stimulating additional next-state transitions through the DFA. When a sequence of symbols has been consumed that matches one of the rules the DFA from which the DFA was constructed, an "accepting state" is reached. An "accepting state" indicates a match by the string of symbols consumed to that point. A classical DFA does not have an obvious way to match begin anchors, because the transitions from the root state only consider the first input symbol. It does not consider characteristics of the position of that symbol in the input stream (BOL, BOS, etc.). Unlike NFA processing, it is not generally feasible to "check" if begin anchors match before consuming the first character in a sequence. This is particularly true in the general case where different rules have different begin anchors, and some rules are anchored while others are not.

One known method to match varying begin anchors with DFAs is to construct multiple different DFAs for use at different positions in the input stream. For example, the regular expression tool "flex" supports BOL anchors by constructing two DFAs, one of which is to be used where the first symbol to scan is at a beginning of line (BOL) position, and the other is to be used where the first symbol is not at a BOL position. The first DFA is able to match all rules, and the second DFA is able to match only rules that are not BOL anchored. This method has important drawbacks. First, while only two DFAs are needed to support a single begin anchor, many DFAs may be necessary to support multiple anchors. For example, to support the three begin anchors BOL (^), BOP (\Y) and WB (\b), $2^3=8$ DFAs are needed. This is due to the fact that various positions in the input stream may satisfy any subset of the three anchors. A large number of DFAs may consume unacceptable amounts of storage space. Second, the need to use multiple DFAs when commencing scans at various input positions often has adverse effects on caches used to access DFA state and transition information or instructions. Commonly, an application needs to find all rule matches occurring at any positions within the input stream, which (again for classical non-Aho-Corasick DFAs) requires separate DFA descents beginning at each symbol in the data stream. If these multiple descents operate in a variety of distinct DFAs, then the cache working set required for acceptable performance is likely larger than the working set using a single DFA, either necessitating larger and more expensive caches, or causing higher cache miss rates, resulting in reduced performance.

An extension to the method discussed above is a combination of multiple DFAs into a single DFA, by constructing a new root state that will transition into one of the original root states by consuming information about the position of the first symbol, but not the first symbol itself. Alternatively, the new root state can consume the symbol before the first symbol, if this conveys enough information to resolve anchors (e.g., if the pre-first symbol is a newline character, then a BOL (6) anchor is satisfied). Although this may provide some improvement over multiple DFAs, there are still drawbacks to this method. For instance, the combined DFA remains as large as the multiple separate DFAs. Although the size may be optimized in a small degree by merging some constituent DFA states, the resulting combined DFA remains larger than a simple DFA constructed for all rules without begin anchors. Also, one additional step is needed for each descent of the DFA—from the new root to one of the original root states. In many applications, the average number of DFA steps required per descent may be quite low, such as 2 steps for instance. Accordingly, one additional step results in proportionally substantial performance degradation and penalty.

In the method of this invention, the effect of a first symbol position that does or does not satisfy various begin anchors is deferred. Unlike previous methods, the first symbol position does not select among DFAs, or affect the first DFA transition from the root state. Rather, the first symbol position is used later in DFA descent, to filter out matches to rules whose begin anchors are not satisfied, or to terminate the DFA descent early if every remaining matchable rule has a begin anchor that is not satisfied. This method enforces the rules' begin anchors with significantly less resource cost. The single DFA is no larger than it would be without the begin anchors, except for space to annotate begin anchor information. No more steps (and sometimes fewer steps) are needed for DFA descent from a first symbol, and cache utilization is unaffected.

FIG. 1 is a representation of a state machine with Begin Anchors ignored. An example set of rules 110 shows a plurality of regex statements and a corresponding set of outputs 1-10. State machine 120 shows the states in a DFA constructed from the rules 110. A DFA descent initially starts at the root state (S0) and transitions therefrom. Matching an "a" at S0 transitions to S1. Matching a "c" at S0 transitions to S12. Matching a "b" at S0 transitions to S6. These state transitions continue or terminate depending on the input stream symbols encountered. Matching an "e" at S2 transitions to S3. State 3 corresponds to output 1. The transitions will occur based on symbol matches occurring and outputs will occur regardless of any anchor requirements. All anchor requirements are ignored. The transitions to any output is irrespective of any begin anchor requirements associated with the regex. An output of 1 is achieved when "age" is matched regardless of whether it is at the BOL as indicated in the example rules 110. Each output is achieved without adherence to anchor status requirements.

Figure 2:
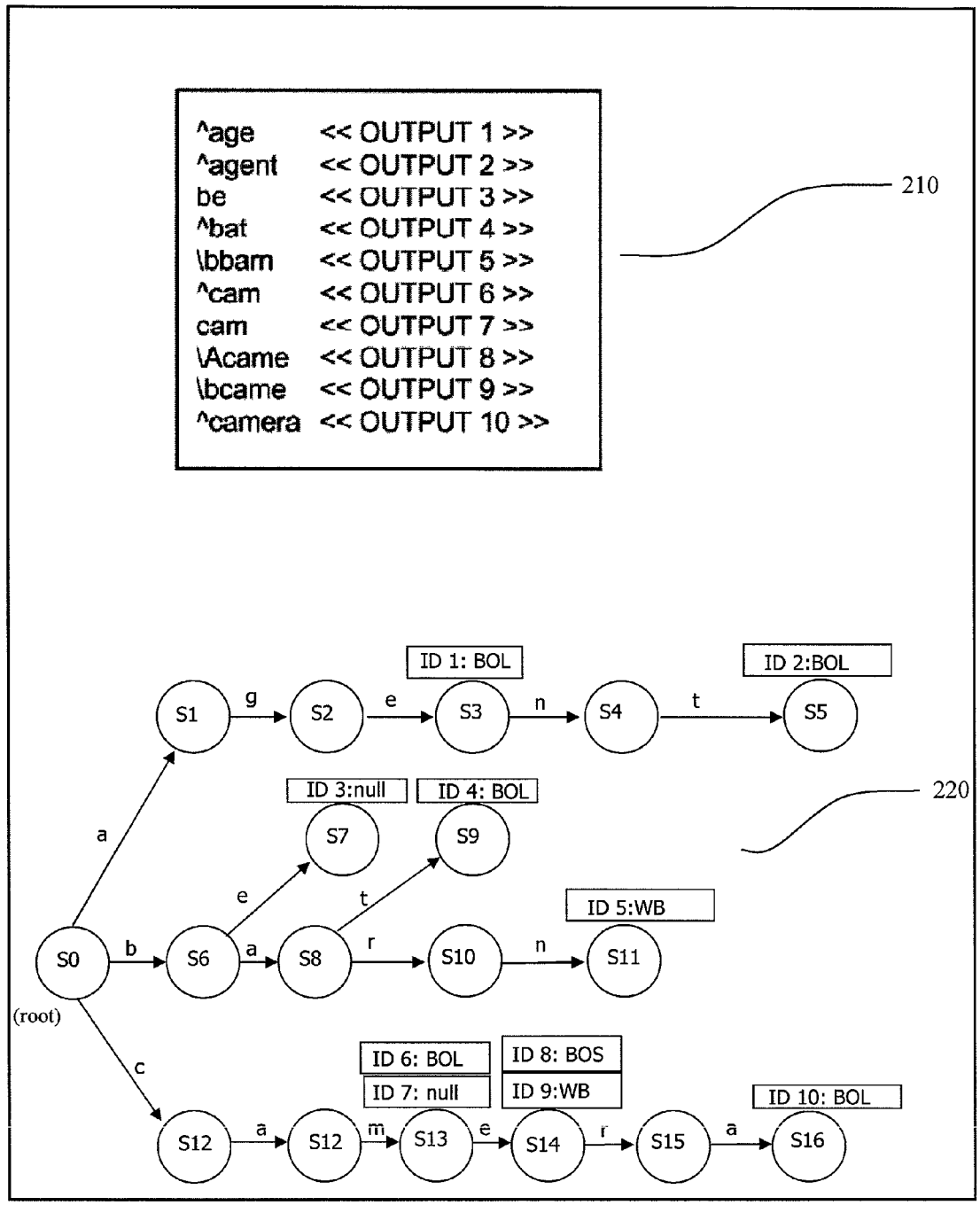
FIG. 2 is a representation of a state machine with Begin Anchors on matches.

FIG. 2 is a representation of a state machine with Begin Anchors on matches. An example set of rules 210 shows a plurality of regex statements and a corresponding set of outputs 1-10. State machine 220 shows the states in a DFA constructed from the rules 210. A DFA descent initially starts at the root state (S0) and transitions therefrom. The accepting states of state machine 220 are annotated with begin anchor requirements, when they correspond to expressions with begin anchors in rules 210. For example, expression 1 "^age" has a BOL anchor ("^"), which is annotated on its accepting state S3 along with the corresponding ID as "ID 1: BOL". Expression 3 "be" has no begin anchor, so its accepting state S7 has no begin anchor requirement annotated, shown as "ID3: null". Expressions 8 "\Acame" and 9 "\bcame" have BOS ("\A") and WB ("\b") begin anchors respectively, so their common accepting state S14 is annotated with both requirements along with the corresponding IDs, as "ID 8: BOS" and "ID 9: WB".

In a method of this invention, a single DFA is constructed from all rules, deferring action on their begin anchors. The accepting states of this DFA, which indicate matches to one or more rules, are annotated with indications of which begin anchors, if any, the matched rules require. This DFA is executed in the usual manner, consistent with the execution accompanying FIG. 1, consuming a first symbol to transition from the root state, S0 to a next state, and additional symbols to transition to further states, until matching fails because the next symbol does not correspond to any DFA transition from the current state. If one or more accepting states are reached, indicating matches to one or more rules, begin anchor annotations are checked before reporting or processing these matches. Any begin anchor requirements annotated in the accepting state are noted. For example, a transition to S14 would indicate a match for "came". Output 8 is annotated with a BOS anchor requirement. If begin anchor requirements are present, the position of the first symbol consumed is examined, to determine if it satisfies the begin anchors. If not, the "accept" is ignored, and no match is reported or processed. If so, the match is reported or processed normally.

Before commencing each DFA descent from a first symbol, a record may be made of which begin anchors this first symbol position satisfies. This record may be referred to each time the DFA descent needs to check begin anchors, without re-examining the first symbol position. This record will be referred to hereafter as the "current anchor status". It is understood also, that the position of the first symbol consumed may be examined directly without using such a "current anchor status" record.

In one embodiment of this invention, a methodology is adopted whereby each rule may use only a single begin anchor, if it uses any begin anchors. Pursuant to this policy, when a potential match in an accepting state is annotated with begin anchor requirements, this information may be encoded as a single number. An example of this is as follows: a 0 can represent no anchor, 1 represents the first supported anchor, 2 represents the second supported anchor, and sequentially forward. If it is required to support multiple anchors on the same rule, a system is adoptable to consider each possible combination of begin anchors as a single "complex" begin anchor. For example, a rule "\b^alpha.*beta" which has two begin anchors (WB and BOL) may be considered to have a single begin anchor (WB+BOL) that is satisfied when the first symbol of a match is at both beginning of line and word boundary positions. In order to simplify the description, by applying this system, if necessary, it can be assumed hereafter that each rule may use only a single (possibly complex) begin anchor.

In an embodiment of the invention, if a state has multiple matches, each match is encoded in a separate instruction. For example, state 14 in FIG. 2 is a state having multiple matches—ID 8:BOS and ID 9:WB. Each instruction indicating a match will have separate begin anchor annotations pertaining to that match.

Figure 3:
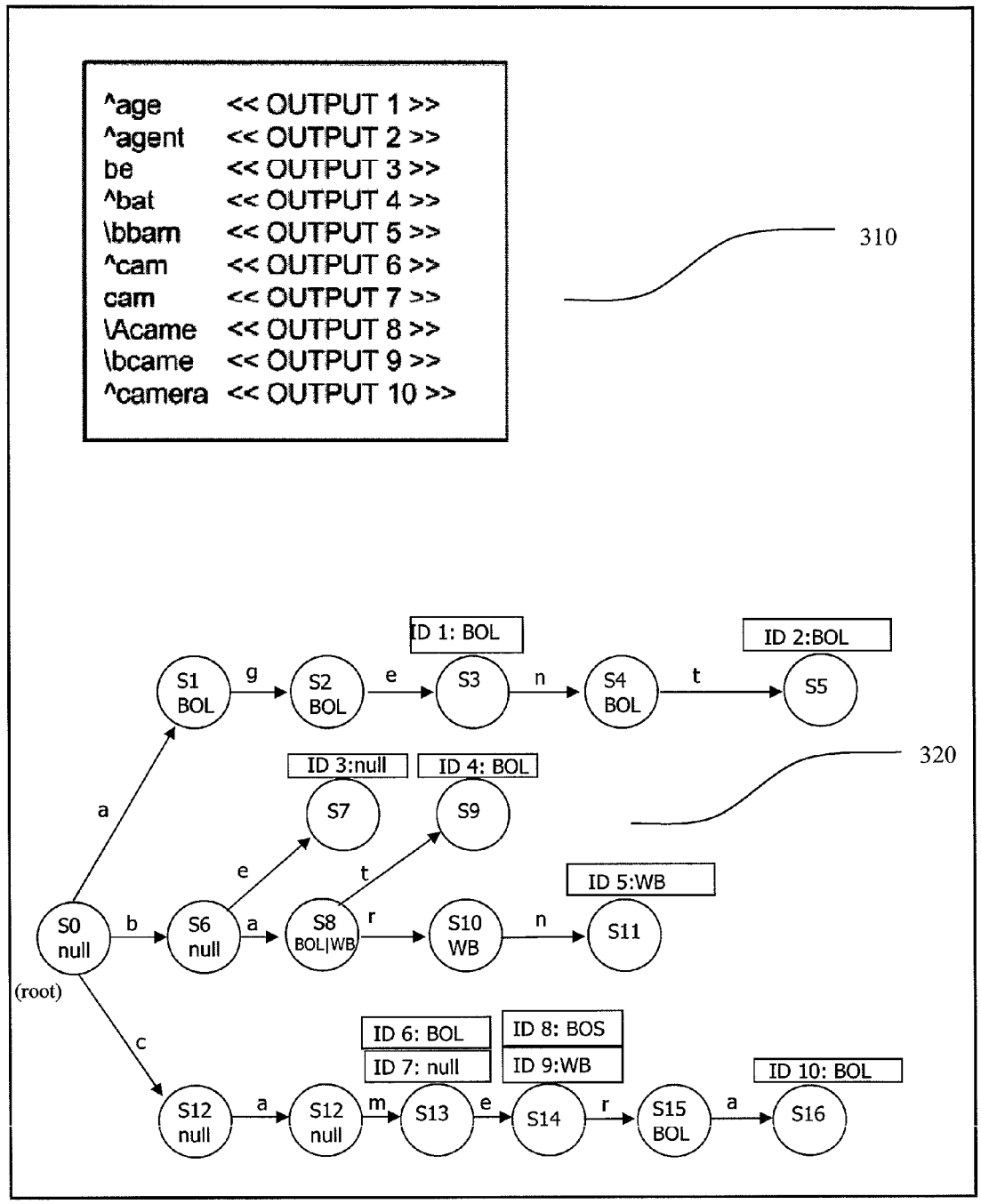
FIG. 3 is a representation of a state machine with Early Exit Information on non-accepting States.

FIG. 3 is a representation of a state machine with Early Exit information on non-accepting states. An example set of rules 310 shows a plurality of regex statements and a corresponding set of outputs 1-10. State machine 320 shows the states in a DFA constructed from the rules 310. The DFA descent initially starts at the root state (S0) and transitions therefrom. In the single DFA constructed under an embodiment of the invention, all DFA states, or some DFA states such as non-accepting states, are annotated with begin anchor "early exit" information. Early exit information annotation in a given state depends on which accepting sates are reachable from that state, by any sequence of possible future transitions. If any accepting state is reachable matching a rule without begin anchors, no early exit (or null early exit code) is annotated. If all reachable accepting states match only rules with begin anchors, and then the early exit annotation indicates which begin anchors those are. During a descent through this DFA, in any state with (non-null) begin anchor "early exit" annotation, the scanner has an opportunity to terminate early. The annotated early exit begin anchors are compared with the current anchor status. If any of the begin anchors are satisfied, the DFA descent must continue. A rule with that begin anchor may still be matched. If none of the begin anchors are satisfied, the DFA descent may terminate.

In FIG. 3, S7 is an accepting state with no begin anchors. Therefore, a transition to S7 will occur through S6 with no early exit. However, a transition from S6 to S8 will encounter early exit annotations. S8 has annotations for both BOL and WB, because accepting state S9 with BOL anchor and S11 with WB anchor are reachable from S8. If both of these begin anchors are not satisfied, the descent will early exit. However, if one annotation is satisfied, then the descent will continue. If the state transitions to S10, then only one early exit annotation will apply—WB. If a WB annotation is not satisfied at this point, the descent will early exit.

More generally, for example, a DFA has accepting states X, Y and Z. X accepts for a rule with a BOL anchor, Y accepts for a rule with and BOS anchor, and Z accepts for a rule with no begin anchor. In this example, DFA state A is capable of reaching X, Y and Z by further transitions. In this instance, state A will not be annotated with early exit information because it can reach accepting state Z with no anchor requirement. DFA state B is capable of reaching only X and Y. In this instance, state B will be annotated with early exit information listing BOL and BOS begin anchors. During DFA descent, when visiting state A, no early exit is possible. But when visiting state B, an early exit may be possible. If the current anchor status matches BOL or BOS anchors, then the descent must continue through state B. Alternately, the descent may terminate at state B.

If all possible DFA states are annotated with early exit information, the number of steps in any DFA descent is minimized (taking the first early exit opportunity), as it would be in a multiple DFA scenario. If not all possible DFA states are annotated with early exit information, for example if only non-accepting states are annotated, then the number of steps in a descent may not be minimal, but it is still likely to be less than without the early exit optimization. After reaching the first state in a DFA descent where an early exit would have been possible, if early exit information had been annotated, the next state reached which carries early exit annotation will allow early exit.

Figure 4:
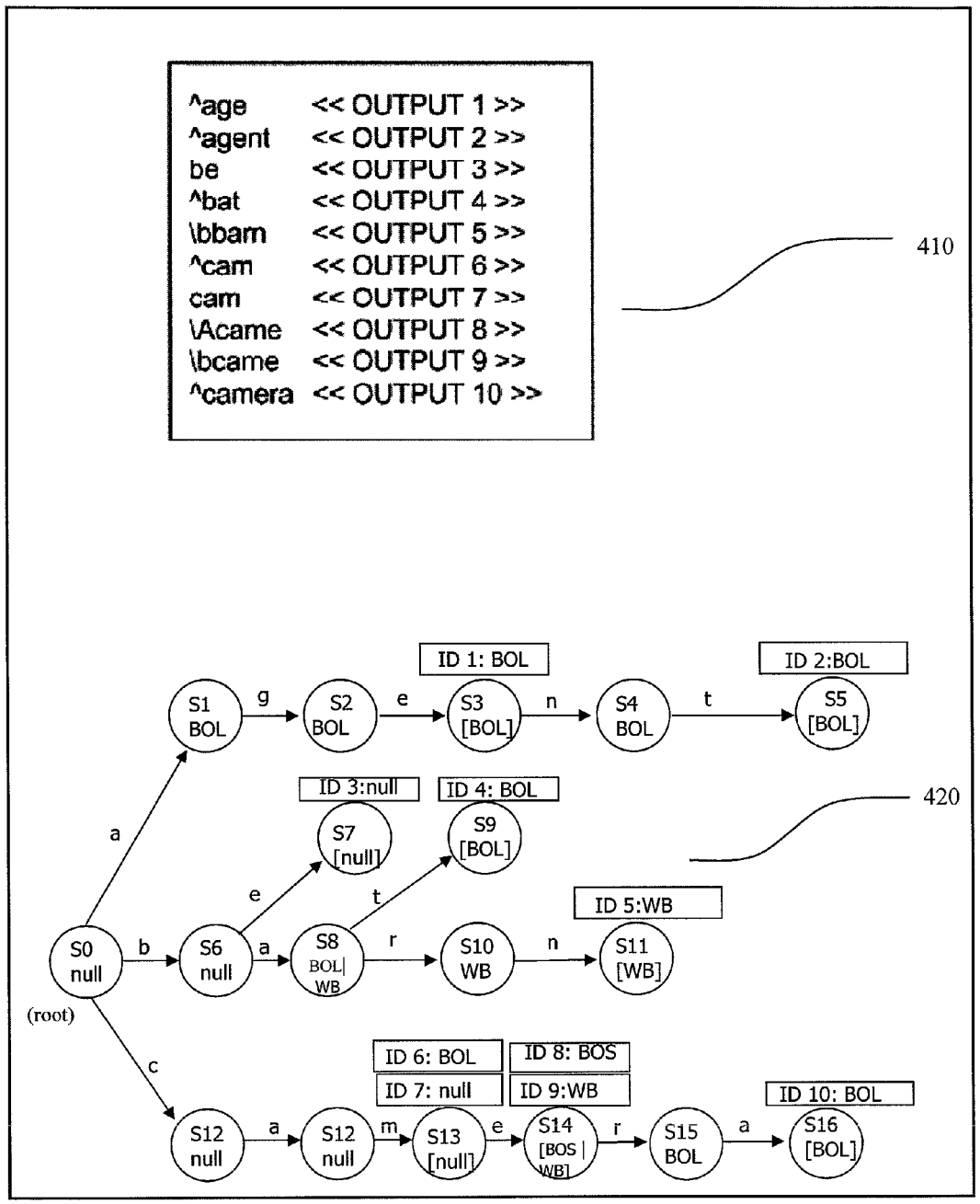
FIG. 4 is a representation of a state machine with Accept Begin Anchors in Accepting States.

FIG. 4 is a representation of a state machine with Accept Begin Anchors in Accepting States. An example set of rules 410 shows a plurality of regex statements and a corresponding set of outputs 1-10. State machine 420 shows the states in a DFA constructed from the rules 410. A DFA descent initially starts at the root state (S0) and transitions therefrom. In an embodiment of the invention, each accepting state may be annotated with "accept begin anchors", which distills information about begin anchors of the matches in that state. If an accepting state has any matches with no begin anchors, then no accept begin anchors may be annotated, or a null code may be annotated. When all matches require begin anchors, the accepting state will be annotated with accept begin anchors indicating all distinct begin anchors present.

As an example, if an accepting state has three matches for a rule with BOL anchors, and five matches for rules with BOP anchors, the accepting state could be annotated with accept begin anchors of BOL and BOP. During a DFA descent, accept begin anchors may be used to speed up the processing of accepting states. When an accepting state is visited, all matches in that accepting state are examined to determine if their begin anchors are satisfied by the current anchor status. Also, matches with no begin anchors or satisfied begin anchors are reported or processed. However, if accept begin anchors (non-null) are annotated on the accepting state, these may be compared directly to the current anchor status. In the event that at least one accept begin anchor is satisfied by the current anchor status, the matches can be individually examined, and output if their anchors are satisfied. But if none of the accept begin anchors are satisfied by the current anchor status, the "accept" may be ignored, and none of the matches examined. This speeds up processing of accepting states containing matches to begin anchored rules by avoiding time spent examining individual matches.

In FIG. 4, S3 is annotated with accept begin anchor BOL, because it has one match with begin anchor BOL. S13 is annotated with null accept begin anchor, because it has a match with no begin anchor. S14 is annotated with BOS and WB accept begin anchors, because it has a match with BOS begin anchor and another match with WB begin anchor. During a DFA descent, if accepting state S13 with null accept begin anchor is visited, its two matches must be examined to determine if their begin anchors are satisfied, in order to report or process matches with no begin anchors or satisfied begin anchors. If accepting state S14 with BOS and WB accept begin anchors is visited, and neither BOS nor WB accept begin anchors are satisfied by the current anchor status, then there is no need to examine the individual matches.

Accept begin anchors may be used to support "longest leftmost" or "greedy" matching, commonly used for language or protocol parsing, in which overlapping matches are not permitted. In greedy matching, each DFA descent should report only a single match, from the last accepting state visited. (Additionally, greedy matching imposes restrictions on first-symbol positions used to initiate DFA descents.) A standard method for doing this is to record "last accepting state" information, which indicates the accepting state most recently visited during a DFA descent. Each time another accepting state is visited, the last accepting state information is updated to indicate that accepting state, but no matches are immediately reported. After the DFA descent terminates, a match is reported from the recorded last accepting state. If the last accepting state indicates multiple matches, a method existing in the art is used to select one, such as reporting the first match listed.

If a DFA descent visits an accepting state having only matches with begin anchors not satisfied by the current anchor status, the last accepting state information should not be updated because these are not valid matches. Accordingly, in the absence of begin anchors, last accepting state information is updated when an accepting state is visited without examining the individual matches, and support for begin anchors according to the embodiment of the invention adds a step of examining individual matches, to determine if one has a satisfied begin anchor or no begin anchor. This is necessary so that last accepting state information can be updated.

In an embodiment of the invention, this additional step is skipped, thus maximizing speed and efficiency of the regular expression process. During a DFA descent, when an accepting state is visited, the accept begin anchors may be compared with the current anchor status, without examining each match. If no accept begin anchors are annotated, or if at least one of the accept begin anchors is satisfied by the current anchor status, then the last accepting state information should be updated. Otherwise it will not be updated. According to this embodiment of the invention, last accepting state information may be updated more quickly, by considering only one set of annotated accept begin anchors, without examining each match.

Figure 5:
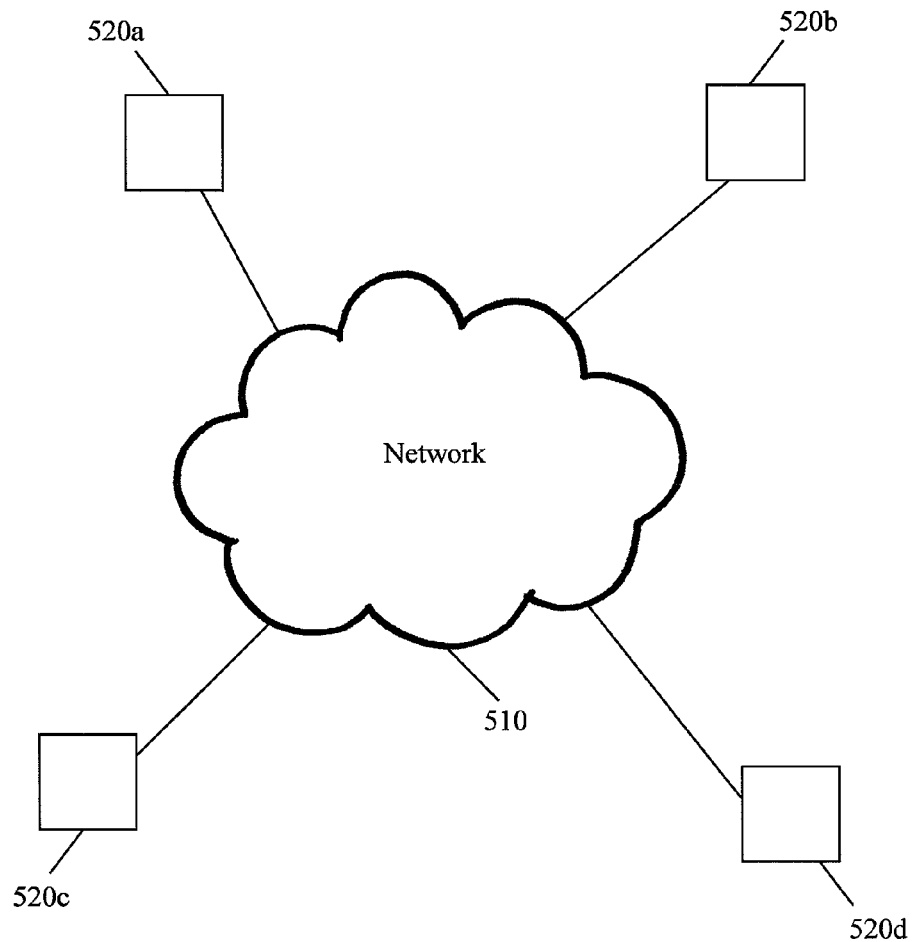
FIG. 5 is a representation of a network and servers.

FIG. 5 is a representation of a network and servers. Shown are a network 510 and a plurality of servers 520a, 520b, 520c, 520d attached to the network. Once information arrives at a server 520a, 520b, 520c, 520d, having gone through all of the routing, processing and filtering along the way, it is typically further processed. This further processing necessarily needs to be high speed in nature.

Figure 6:
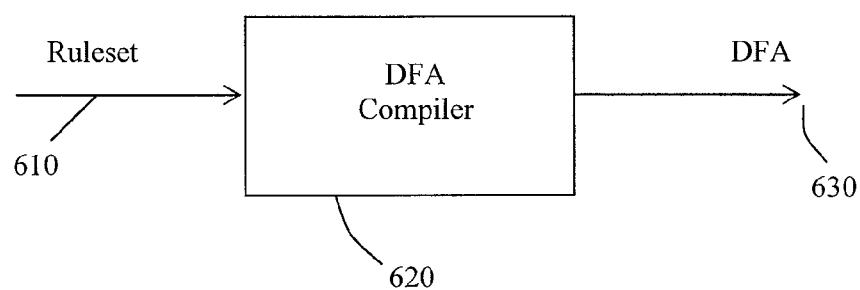
FIG. 6 shows a DFA compiler.

FIG. 6 shows a DFA compiler. A DFA compiler 620 is programmed to annotate the begin anchor information of a ruleset 610 into a DFA representation 630. The DFA scanner 620 may be implemented in hardware of software.

According to the embodiments of the invention, a DFA representation must be chosen supporting the annotation of begin anchor information as described. A DFA compiler (written according to methods common in the art) must be programmed to annotate the begin anchor information into the DFA representation. A DFA scanner, which scans streams of input symbols for matches using a DFA must be implemented to be capable of decoding, checking, and utilizing begin anchor annotations as described. Such a DFA scanner may be implemented in hardware or software. A stream of input symbols is communicated into the scanner, and reported matches to rules with and without begin anchors is communicated out of the scanner.

What is claimed is:

1. A method of matching a string of symbols to a ruleset, said ruleset comprising a set of pattern matching rules, comprising:
   at a compiler;
      ignoring begin anchor requirements when constructing a DFA from all the rules of the ruleset; and
      annotating the accepting states of the DFA with begin anchor information;
   at a server,
      receiving an input stream comprising said string of symbols;
      to match symbols in said string of symbols, executing the DFA by a descent from a DFA root state;
      checking the begin anchor annotations to determine whether begin anchor requirements are satisfied if an accepting state match is reached; and
      reporting the match if the begin anchor requirements as annotated are satisfied; and
      prior to descent of the DFA, building a record of which begin anchors are satisfied by a first symbol position, wherein the record is referable during each DFA descent to check begin anchor status.

2. The method of claim 1, wherein the step of annotating the accepting states comprises annotating each instruction that indicates a match with the begin anchor requirement.

3. A method of matching a string of symbols to a ruleset, said ruleset comprising a set of pattern matching rules, comprising:
   at a compiler;
      ignoring begin anchor requirements when constructing a DFA from all the rules of the ruleset;
      annotating the accepting states of the DFA with begin anchor information;
      when a potential match in an accepting state is annotated with begin anchor requirements, encoding such information with a single indicator, wherein at least one indicator represents a plurality of supported anchors; and
   at a server,
      receiving an input stream comprising said string of symbols;
      to match symbols in said string of symbols, executing the DFA by a descent from a DFA root state;
      checking the begin anchor annotations to determine whether begin anchor requirements are satisfied if an accepting state match is reached; and
      reporting the match if the begin anchor requirements as annotated are satisfied.

4. A method of matching a string of symbols to a ruleset, said ruleset comprising a set of pattern matching rules, comprising:
   at a compiler,
      ignoring begin anchor requirements when constructing a DFA from all the rules of the ruleset; and
      annotating at least one state of the DFA with early exit information, said early exit information comprising begin anchor requirements for all accepting states reachable from said state; and
   at a server,
      receiving an input stream comprising said string of symbols;
      to match symbols in said string of symbols, executing the DFA by a descent from a DFA root state; and
      terminating the descent if, during the execution of the DFA when visiting said at least one state, early exit information is not satisfied.

5. The method of claim 4, wherein the step of annotating at least one state of the DFA comprises annotating all states of the DFA with early exit information.

6. The method of claim 4, wherein the step of annotating at least one state of the DFA comprises annotating all non-accepting states with early exit information.

7. A method of matching a string of symbols to a ruleset, said ruleset comprising a set of pattern matching rules, comprising:
   at a compiler,
      ignoring begin anchor requirements when constructing a DFA from all the rules of the ruleset; and
      annotating at least one accepting state of the DFA with accept begin anchor information, said accept begin anchor information indicating all distinct begin anchor requirements for rule matches associated with said accepting state; and
   at a server,
      receiving an input stream comprising said string of symbols;
      to match symbols in said string of symbols, executing the DFA by a descent from a DFA root state;
      if an accepting state is visited, comparing the accept begin anchor annotations directly to a current anchor status;
      if at least one accept begin anchor is satisfied by the current anchor status, determining that at least one match is successful; and
      if it is determined that at least one match is successful, examining each match to determine if its anchor requirements are satisfied, and outputting information for each match if its anchor requirements are satisfied.

8. The method of claim 7, further comprising:

updating last accepting state information for greedy matching if it is determined that at least one match is successful.

* * * * *